United States Patent
Tytgat et al.

(10) Patent No.: US 9,589,369 B2
(45) Date of Patent: Mar. 7, 2017

(54) METHOD AND ARRANGEMENT FOR IMPROVED IMAGE MATCHING

(75) Inventors: Donny Tytgat, Ghent (BE); Jean-Francois Macq, Ganshoren (BE); Sammy Lievens, Brasschaat (BE); Maarten Aerts, Beveren-Waas (BE)

(73) Assignee: Alcatel Lucent, Boulogne-Billancourt (FR)

( * ) Notice: Subject to any disclaimer, the term of this patent is extended or adjusted under 35 U.S.C. 154(b) by 465 days.

(21) Appl. No.: 13/509,760

(22) PCT Filed: Dec. 7, 2010

(86) PCT No.: PCT/EP2010/069088
§ 371 (c)(1),
(2), (4) Date: Aug. 14, 2012

(87) PCT Pub. No.: WO2011/070023
PCT Pub. Date: Jun. 16, 2011

(65) Prior Publication Data
US 2012/0299911 A1    Nov. 29, 2012

(30) Foreign Application Priority Data

Dec. 11, 2009   (EP) .................................... 09290933

(51) Int. Cl.
*G06T 7/20*    (2006.01)
*G06K 9/00*    (2006.01)
*G06T 7/00*    (2006.01)

(52) U.S. Cl.
CPC ........ *G06T 7/2086* (2013.01); *G06K 9/00201* (2013.01); *G06T 7/0071* (2013.01); *G06T 7/0075* (2013.01); *G06T 2207/10021* (2013.01)

(58) Field of Classification Search
CPC ......... G06T 19/00; G06T 17/20; G06T 17/00; G06T 15/10; G06T 15/00
See application file for complete search history.

(56) References Cited

U.S. PATENT DOCUMENTS 6,072,903 A   6/2000  Maki et al.
6,658,136 B1  12/2003 Brumitt
(Continued)

FOREIGN PATENT DOCUMENTS

EP    1482448      12/2004
WO    99/06940     2/1999
WO    2005/067424  7/2005

OTHER PUBLICATIONS

Chin Seng Chua et al; 3D Free-Form Surface Registration and Object Recognition; International Journal of Computer Vision; Kluwer Academic Publishers, Norwell, US LNKD—DOI:10.1007/BF00127819; vol. 17, No. 1, Jan. 1, 1996; pp. 77-99; XP000554284; ISSN: 0920-5691.
(Continued)

*Primary Examiner* — Xiao Wu
*Assistant Examiner* — Michelle Chin
(74) *Attorney, Agent, or Firm* — Patti & Malvone Law Group, LLC

(57) ABSTRACT

A method and device for determining at least one set of matching attributes between a plurality of images is disclosed. Two dimensional images are projected to a three dimensional space then searched for matching attributes. Searching for corresponding attributes is much easier and computationally less intensive in the 3D space compared to a search in the 2D space. The method includes steps of projecting at least part of the images of said plurality to a 3-dimensional space resulting in a plurality of 3-D projected images (image1_3D, image2_3D), searching for at least one corresponding set of elements within the 3D projected images of the plurality of 3-D projected images, and calculating back said corresponding elements within the original images of the plurality and providing said corresponding
(Continued)

elements within said original images as said at least one set of matched attributes.

21 Claims, 12 Drawing Sheets

(56) References Cited

U.S. PATENT DOCUMENTS 7,317,812 B1 1/2008 Krahnstoever et al.
7,835,568 B2 * 11/2010 Park et al. .................... 382/154

OTHER PUBLICATIONS

Xiaoguang Lu et al; Three-Dimensional Model Based Face Recognition; Pattern Recognition, 2004; ICPR 2004; Proceedings of the 17th International Conference on Cambridge, UK; Aug. 23-26, 2004; Piscataway, NJ, USA; IEEE LNKD—D0I:10.1109/ICPR.2004.1334127; vol. 1; Aug. 23, 2004; pp. 362-366; XP010724260; ISBN: 978-0-7695-2128-2.
Kyle Heath et al; Multi-Person Tracking from Sparse 3D Trajectories in a Camera Sensor Network; Distributed Smart Cameras, 2008; IDCSC 2008; Second ACM/IEEE International Conference on, IEEE, Piscataway, NJ, USA; Sep. 7, 2008; pp. 1-9; XP031329212; ISBN: 978-1-4244-2664-5.
Xu Gang et al; A New 3D Reconstruction Method Based on Gray Similarity of the Projecting Grid Points; Acta Optica Sinica; vol. 28, No. 11, Nov. 30, 2008; pp. 2175-2180.

* cited by examiner

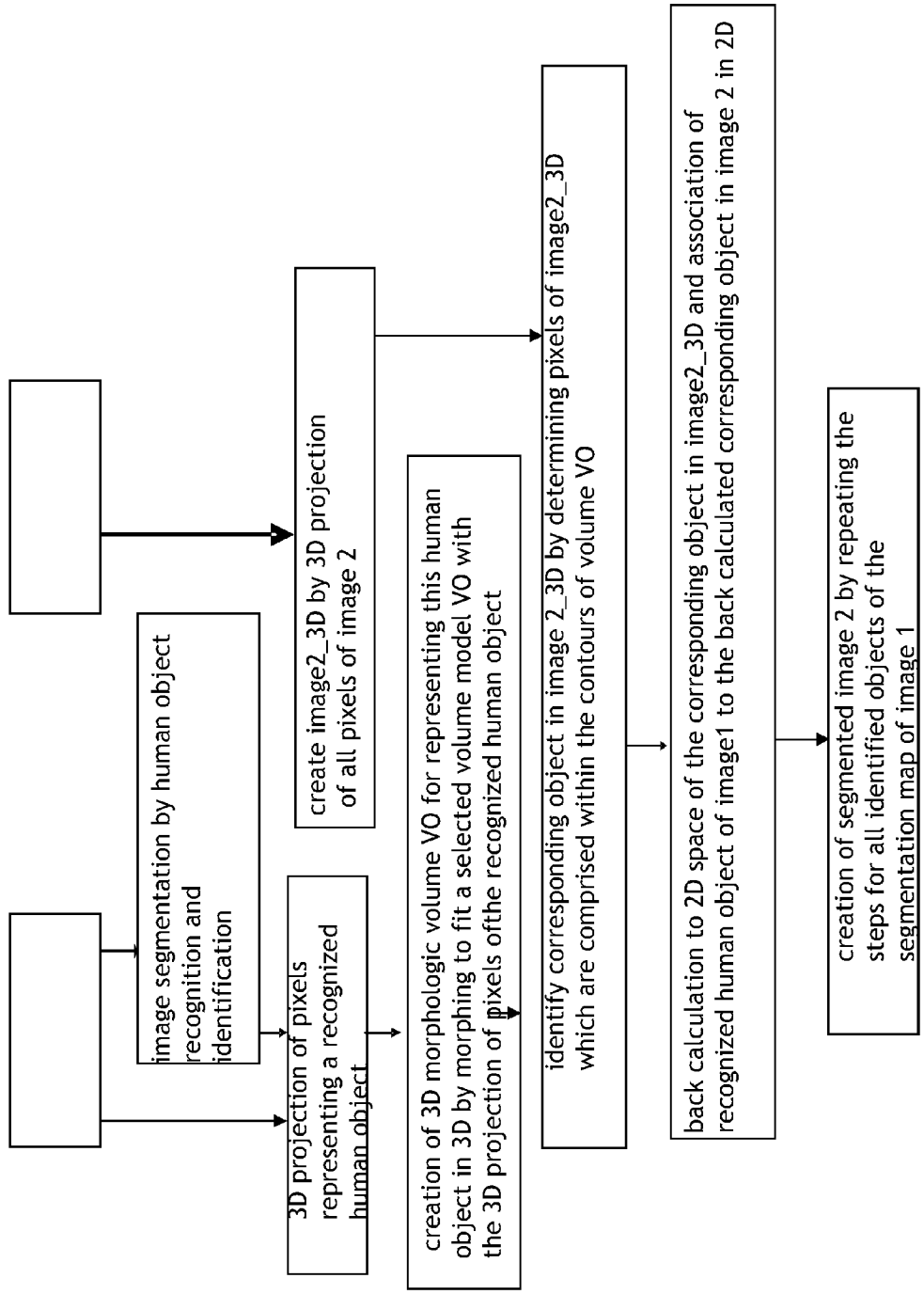

METHOD AND ARRANGEMENT FOR IMPROVED IMAGE MATCHING

The present invention relates to a method for determining at least one set of matched attributes between a plurality of images.

BACKGROUND

Current techniques for determining such a set of matched attributes such as e.g. matched pixels or matched objects make use of 2-dimensional, hereafter abbreviated as 2D, image processing techniques in order to find such matched attributes between two or more images. This involves performing searches in the 2D domain to find corresponding pixels or pixel groups in these images. Known techniques are mostly based on block matching techniques involving placing a fictitious block around a pixel in one of the images, and searching for blocks in the other images which have the best correspondence with the first one, using metrics that calculate a correspondence or matching score based on these blocks around the pixels in the images. These solutions are computationally intensive, and are not robust when the images are e.g. generated by two cameras having a large baseline, meaning that there is a large distance between these cameras. Such images or views will show a significant difference. Most of the known methods furthermore require a certain overlap of the objects in the images between which correspondence or matching is searched for. In addition, when correspondences are searched at an object level rather than at the pixel level itself, the state of the art methods fail in case the viewpoints are so different that the pixel content of these objects is totally different, despite the fact that the object itself is the same in both images. This can for instance be the case when one image displays e.g. a human head showing details of the face of a person as the image is taken from a camera in front of this person, while another image displays the same human head, but with details of the back of the head such as the hair, as this image was taken from a camera at the back of this same person.

It is thus an object of the present invention to set out an improved method for determining matched attributes between a plurality of images, which can solve the above mentioned prior art problems.

SUMMARY

According to the invention this object is solved by the method comprising a step of projecting at least part of the images of said plurality to a 3-dimensional space resulting in a plurality of 3-dimensional projected images, a step of searching for at least one set of corresponding 3-dimensional elements within the 3-dimensional projected images of the plurality of 3-dimensional projected images, a step of calculating back said corresponding 3-dimensional elements of said at least one set to corresponding 2-dimensional attributes within the images of the plurality and providing said corresponding 2-dimensional attributes within said images as said at least one set of matched attributes.

Projecting the two-dimensional images to a three dimensional, hereafter abbreviated with 3D, space, which is possible in case e.g. depth information is available for these images, will enable searching for corresponding or matching elements in this 3D space. This search for corresponding elements is much easier and computationally less intensive in the 3D space compared to a search in the 2D space as will become clear from different embodiments further described.

By back-calculating the 3D corresponding elements from the 3D to the 2D space, matching attributes will be provided in a simple, yet very accurate way. Furthermore, this search for corresponding elements within the 3D space will enable to find matching attributes in 2D such as the previously mentioned example of an identified and recognized human head from images taken from the front and the back side of the same person. This was until now not possible by using the state of the art 2D techniques.

An attribute may comprise a pixel, thus enabling to determine matching pixels between the different images. An attribute may also comprise an object containing a group of pixels, enabling to determine matching objects between the different images.

A variant embodiment further includes a step of selecting one image of said plurality as a reference image, a step of identifying an attribute on said reference image, a step of identifying the 3-dimensional projection of said attribute as a 3-dimensional element of said at least one set of corresponding 3-dimensional elements whereby at least one corresponding 3-dimensional element is searched in the 3-dimensional projected images of the other images of the plurality.

This provides a simple method, especially in case the plurality of the images comprises more than two images. By selecting one image as a reference image, calculations for finding matching attributes between this reference image and the other images can be very simple as will be shown by means of several examples.

In another embodiment said attribute comprises a pixel and said at least one corresponding 3-dimensional element is searched by forming a volume body around the 3-dimensional projection of said pixel such that projected pixels of the 3-dimensional projected images of the other images of the plurality which are falling within the contours of said volume body are considered as corresponding 3-dimensional elements for said 3-dimensional projection of said pixel.

This provides a simple method for identifying matched pixels which comprise the pixel under consideration and the back projected 3-dimensional pixels falling within the contours of this volume body.

The arbitrary volume body which is used in the 3D space for determining corresponding pixels may be an ellipsoid centered around said 3-dimensional projection of said pixel.

This proves to be a very simple embodiment for forming a 3D volume body centered around a 3D projected pixel.

In another variant method an element of said at least one set of corresponding 3-dimensional elements comprises at least one projected 3-dimensional object obtained from one or more 3-dimensional projections of respective reference images selected from said plurality and a corresponding 3-dimensional element is determined as a group of 3-dimensional projections of pixels from another projected image of said plurality which 3-dimensional projections of pixels are falling within the contours of a volume body approximating said at least one projected 3-dimensional object, such that said at least one set of matched attributes is obtained by the back calculation of said at least one projected 3-dimensional object and of said group to the original images in the 2-dimensional domain.

This allows to identify matching objects.

A variant method further includes a step of 2-dimensional image recognition on said respective reference images such that to said at least one projected 3-dimensional object at least one recognized object on said respective reference images is associated.

This allows to identify matched objects in one image, based on earlier performed object recognition on another image of the plurality. In this way a simple method for pattern or image recognition on an image is obtained by identifying matched objects between that image and a reference image on which recognition techniques were already performed in the 2D domain, and on which recognized objects or patterns were thus already identified. By determining matched attributes between the image and already identified objects in the reference image, via the previously mentioned techniques, a very simple way of performing pattern or object recognition with applications of segmentation of this image are obtained.

Another variant method further includes a step of 3-dimensional image recognition on said one or more 3D projections of said respective reference images, such that to said at least one projected 3-dimensional object at least one recognized object resulting from said 3-dimensional image recognition is associated.

This provides an alternative for these images for which a 2-dimensional object recognition is very difficult. Based on 3-dimensional object recognition techniques, object can be back identified in the 2-dimensional space.

In another variant, said volume body is selected from a set of volume models associated to said at least one projected 3-dimensional object.

This proves to be very interesting in case matched objects having a typical morphological shape such as e.g. a human head, are to be identified. By selecting a volume model with the form of e.g. such a human head from a set of volume models, 3D projected pixels of the other images falling within the contours of this head can then be considered as corresponding pixels belonging to the 3D projected head in 3D, and their back projection to 2D will then result in the identification or the recognition of this human head in 2D.

In yet another embodiment said volume body can be adapted by fitting said volume body with said at least one projected 3-dimensional object.

This allows to further improve the accuracy of the matching process by e.g. morphing the selected shape of the human head with the actual 3D projected pixel data of the recognized head in 2D. Robustness of the recognition is thereby further improved.

Embodiments of the method can also be used in methods for image recognition of an image from a plurality of images, such that the matched attributes of said at least one set of matched attributes, and pertaining to said image, will be associated to said at least one recognized object on said respective reference images.

Embodiments of the method for determining matched pixels can also be used in a method for determining a motion vector between two images of a video sequence taken at different instances in time.

In a first variant said method includes a step of determining a matched pixel within a first of said two images at the earliest instance in time, for a start pixel of a 2-dimensional motion vector determined between two images taken at said different instances in time of a first video sequence according to any of the claims 1-4, said method further including a step of projecting said 2-dimensional motion vector of said first video sequence to the 3-dimensional space, for obtaining a 3-dimensional motion vector, wherein said 3-dimensional motion vector is applied to the 3-dimensional projection of said matched pixel to thereby obtain a corresponding end point which is further back projected to an end pixel in a second image of said two images such that said matched pixel and said end pixel define said motion vector between said two images of said video sequence.

Alternatively a method for determining a motion vector between two images of a video sequence taken at different instances in time may include a step of determining respective matched pixels within said two images for the start and end pixels of a 2-dimensional motion vector determined between two images taken at said different instances in time of a first video sequence according to any of the claims 1-4, said pair of respective matched pixels in said two images thereby defining start and end pixels of said motion vector of said video sequence.

Both alternatives for determining motion vectors and including embodiments of the methods for determining matched pixels between several images can present valuable alternatives to the classical way of calculating motion vectors, based on classical 2-dimensional block-matching techniques.

Especially for video coding applications this also allows to significantly reduce the processing effort for the motion vector calculations.

The present invention relates as well to device for performing embodiments of the present method, to a computer program adapted to perform any of the embodiments of the method and to a computer readable storage medium comprising such a computer program.

The present invention relates as well to a video encoder and an image analyzer for incorporating such a device.

It is to be noticed that the term 'coupled', used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

The above and other objects and features of the invention will become more apparent and the invention itself will be best understood by referring to the following description of an embodiment taken in conjunction with the accompanying drawings wherein

BRIEF DESCRIPTION OF DRAWINGS

FIG. 4*b* shows an application of the method shown in FIG. 3*b* used for segmentation of image 2 with respect to human recognition, FIG. 5 schematically shows how the method of FIG. 4b can be applied to images showing a human face viewed from different sides.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Figure 1:
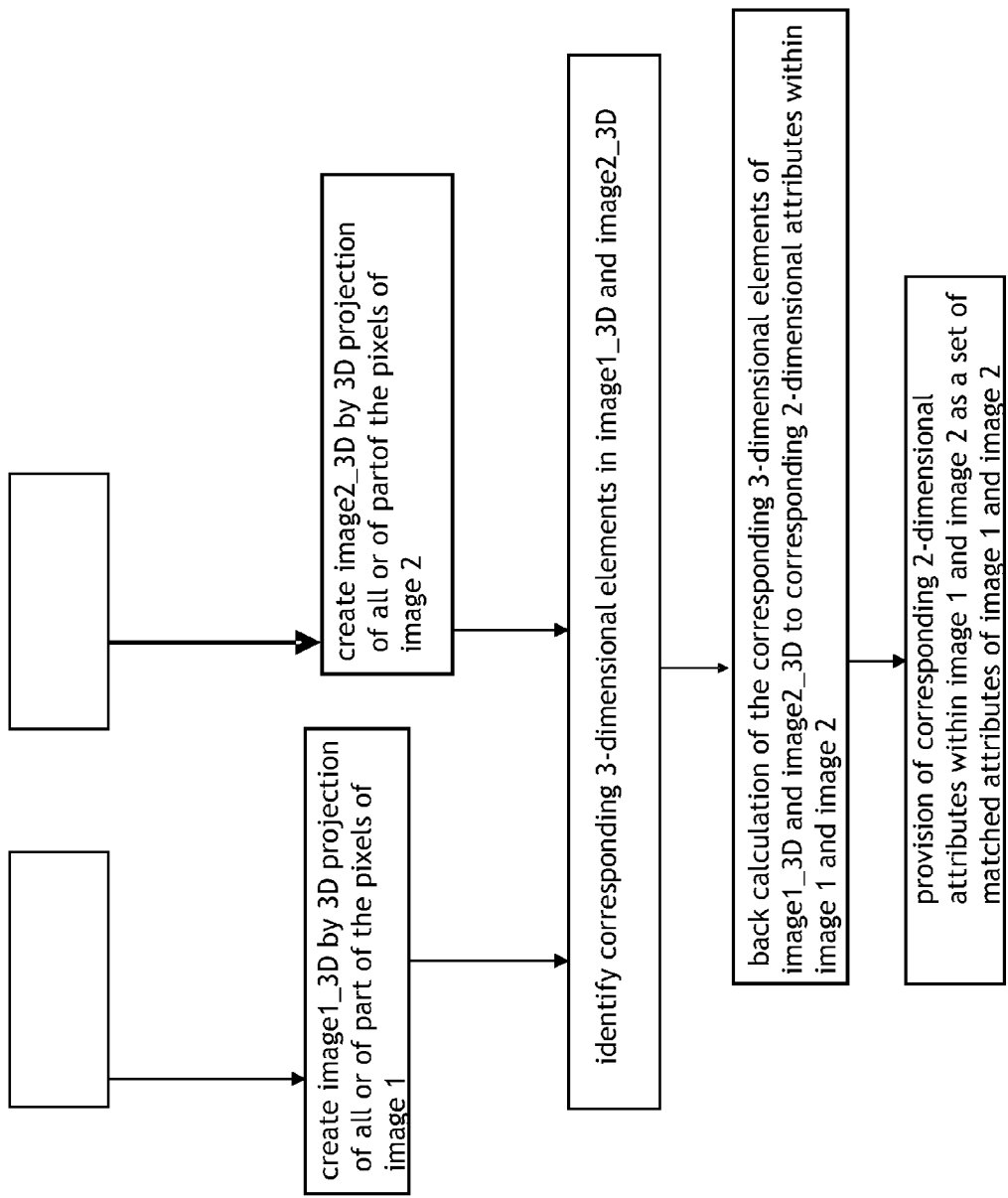
FIG. 1 depicts a high-level schematic of the method.

FIG. 1 shows a high level embodiment of the method for determining a set of matched attributes between a plurality of images. In FIG. 1 only two images, image 1 and image 2 are shown, but other embodiments for determining matched attributes between more than two images are possible as well.

These images or parts of them are further transformed into three-dimensional, abbreviated throughout this document by 3D, images, denoted image1_3D and image2_3D respectively. This is possible for those image representations which comprise pixel information in two dimensions, and also depth information. Depth is a parameter which can be extracted from e.g. a pair of stereo images. This involves some known preprocessing techniques in case the images are merely captured by a simple camera. This depth information can also be directly obtained by using so-called 2D+Z camera's such as time-of-flight camera's. By using this depth information together with the 2D color pixel data a 3D representation of both images can be generated by projecting the 2D image data to a 3D space.

In general only 3D projections or representations are needed for these pixels forming part of or associated to the attributes for which matched attributes in the other images are to be searched for. If, for instance, only one matched counterpart for one particular group of pixels representing an object such as a car, is to be searched for, only the pixels belonging to this car need to be projected to the 3D space. The other images in which the matched attributes are to be searched for can also be partly projected e.g. only the part corresponding to or surrounding the location of pixels of this car in the first image may need projection. However it is also possible that in other embodiments complete 3D images will be reconstructed from all 2D images of the plurality. In all cases imagei_3D, with i indicating the respective image, refers to both the 3D projections of the complete image or of only part of the image.

Once such a 3D representation is obtained, corresponding elements can be searched for within this 3D space. One possibility would be to extrapolate the methods used in 2D for block matching to volume matching of e.g. simple volumes around projected pixels in case corresponding pixels between the 3D projections are to be determined. While this represents one possibility for searching for corresponding or matching pixels within the 3D space, a more simple method involves only using simple volumes around the pixels of only one 3D image, e.g. image1_3D, and then merely checking whether a projected pixel of image2_3D is comprised within this volume.

Figure 2:
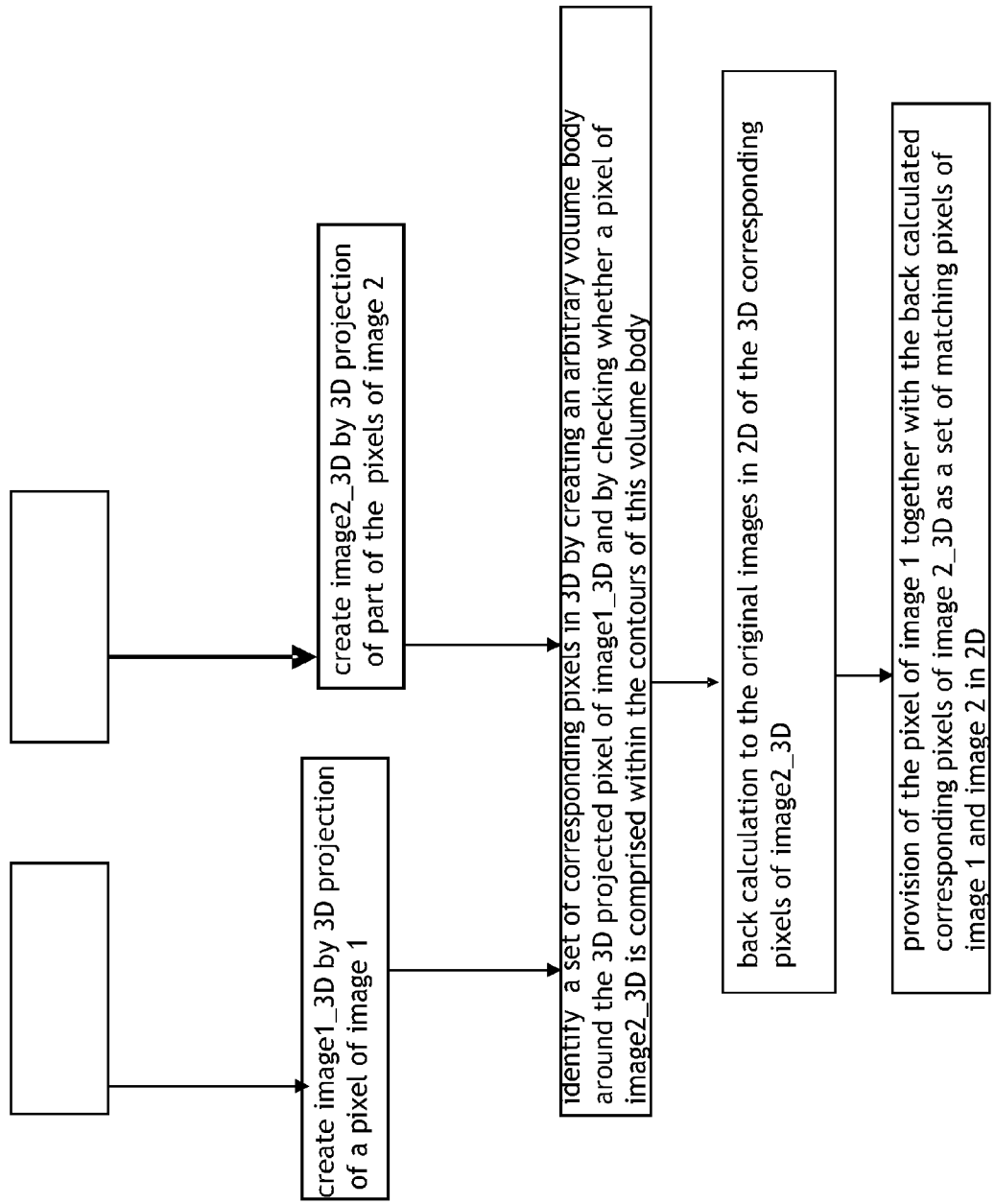
FIG. 2 depicts an embodiment of the method of FIG. 1 for determining a set of matched pixels.

This embodiment will be further explained into detail with reference to FIG. 2.

These corresponding elements to be determined in the 3D space can be pixels, but can also comprise e.g. recognized objects or structures including a set of pixels such as the car in the previously mentioned example, or can comprise some further metadata associated to such a set of pixels such as the name of a recognized person or the type of the recognized car. Searching for such matched objects in the 2D images can then again be performed by projecting the 2D images or part of them to the 3D space and by searching for corresponding projected object volumes in this 3D space. This can be done by means of some iterative process starting from a first guess of projected volumes and by searching for a best match between them by using some metric. Alternative simpler methods will be further explained into detail with respect to FIGS. 3a to 3c.

Once such set of corresponding elements is determined in 3D, a recalculation of the corresponding pixels of the corresponding 3D elements to the 2D space will be performed. This will then result in a provision of a set of matched attributes between the two images in 2D. As mentioned before, such a set of matched attributes can be a set of matched pixels, or a set of matched structures being a set of groups of pixels, or a set of matched objects, each matched object again being represented by a group of pixels in both images.

In case matched pixels are searched for, a very simple method is shown in FIG. 2. As in the general case parts of both images may be projected to the 3D space, resulting in 3D representations denoted by image1_3D and image 2_3D. In case matched pixels in the other images for one particular pixel in one image are searched for, only this one particular pixel can be projected to the 3D space such that image1_3D just comprises this single projected pixel. This is shown in the embodiment depicted in FIG. 2. If it is known that both images are similar, only a small number of pixels of the other images situated on a location around or in the neighborhood of that particular pixel, need to be projected. In case this knowledge is not available, all pixels of all the other images may need to be projected to 3D for generating image2_3D.

For the particular pixel for which some matched pixels in the other images are to be determined, a simple arbitrary volume will be constructed or created around its 3D projection. By checking whether the 3D representations of the other pixels of the other images form part of this volume, it can be decided whether or not these other pixels of the other images match.

While this could give rise to several sets of 3D corresponding pixels, depending on the size and shape of this volume around the respective projected pixel of the reference, a further refinement can be performed to identify the most relevant corresponding 3D pixel, for instance by consideration of the distance to the projection of the reference pixel. This refinement is not shown in FIG. 2.

For identifying corresponding pixels in 3D, a simple volume around the 3D projected pixel for which a matching candidate is to be searched, can be an ellipsoide, or a sphere, or a cube, or a beam, or any other volume body. While a sphere or a cube represent very simple volumes, allowing limited computational resources, the use of volumes having different axial dimensions can have advantages related to accuracy of the match itself. This can e.g. be interesting for stereoscopic image pairs in 2D. For these images, the depth parameter which is needed for the 3D projection, is usually calculated via traditional methods. The accuracy of the calculated depth is however inversely proportional with the value of the depth itself, thus for varying depth values across the images, using ellipsoids with varying dimensions can help to further increase the accuracy for the determination of the corresponding pixels or elements in the 3D space.

Once such a corresponding pixel has been found in the 3D projection of the other images, in this case only in image2_3D, these corresponding 3D projected pixels will be calculated back to indicate the position of the pixels in the original 2D images, resulting in a set of matched pixels in 2D for the original image. In case several matching pixels are found within one or more of the other images, which is of course possible in case the dimensions of the volume body around the 3D projected pixel were too large, some further iterations or refinement calculations can be performed, either by adapting the dimensions of the chosen volume bodies, or, alternatively, one of the corresponding 3D pixels within a 3D projected image can be selected based upon some metrics such as the calculated distance, in the 3D space, between this 3D pixel and the 3D projected pixel of the reference image for which a match was to be found. The 3D pixel in the 3D projected image with the smallest 3D distance with respect to the 3D projected pixel of the reference image will then be selected as the best match in 3D, such that this will be selected as the corresponding element in 3D. This will then be calculated back to the original image in 2D.

Figure 3A:
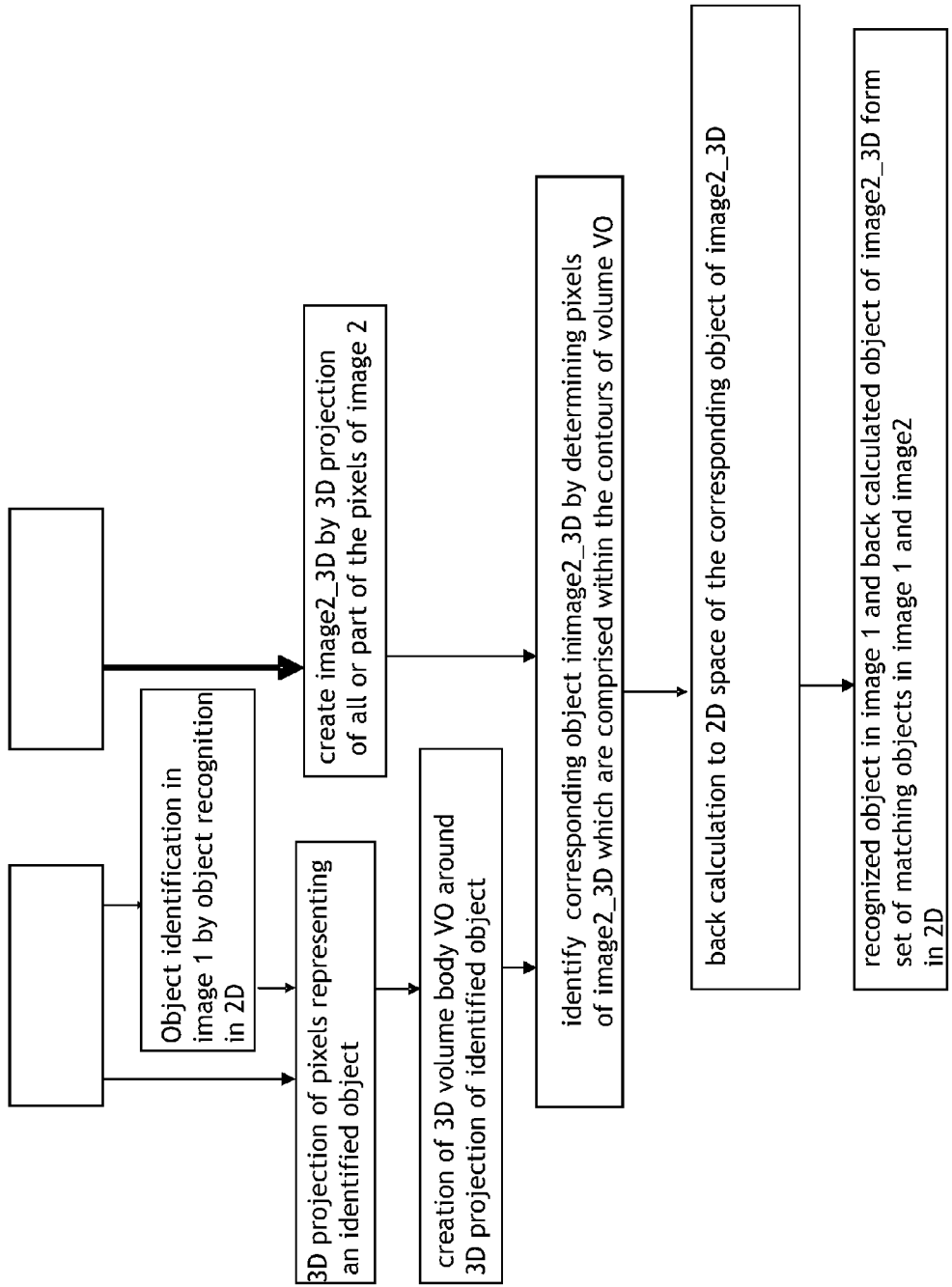
FIG. 3*a* shows an embodiment of the method of FIG. 1 for determining a set of matched objects.

FIG. 3a shows an embodiment of a method for identifying matched objects between two images. Objects can be identified on 2D images by using automated object recognition techniques, or by means of human recognition. In general one image is selected, usually one for which it was determined in an earlier step to be the easiest of the plurality for performing the object recognition on. However it is also possible to select more reference images on which image recognition will be performed, as will be explained more into detail in a later paragraph. The determination or selection of the reference images for performing image recognition on could again have been performed by a human user, or again automatically by a first scan of all images using such traditional image recognition techniques, followed by analysis of the first results. Some traditional recognition techniques allow for a coarse recognition by either only including a limited number of features, or by limiting the analysis on the data. By performing such a quick initial coarse recognition on the plurality of the images which results in a metric that indicates the quality of recognition of the objects, a selection of the image on which to do the full recognition step can be made.

This pre-selection is not shown in FIG. 3a, which figure further indicates that image 1 was selected for undergoing the object recognition procedure in 2D. After this object recognition step, one of the recognized objects is selected for further searching for a matched object in the other images. The pixels belonging to this object on image 1 are therefore projected to the 3D space, resulting in image1_3D. Alternatively all pixels of image 1 can be projected to the 3D space, and the pixels belonging to the object will be specially identified in this image1_3D. In parallel also image2_3D is generated by projecting all or part of the pixels of image2 to the 3D space.

In order to find a matched object for the recognized object, a first possibility comprises searching for matched pixels for all pixels of this object. To this purpose several options are available which will be discussed in a later paragraph. Once these matched pixels are found, the group of pixels comprising these matched pixels is then considered as a matched object in the other image. In some embodiments some further post-processing can be needed on the obtained set of matched objects, depending on the application which will further use the set of matched objects. This post-processing can be interesting to e.g. further eliminate noise.

In order to check which group of pixels of image 2 form a matched object with the selected or identified object of image 1, a pixel-by-pixel approach can be applied by again forming arbitrary volumes around all the projected pixels of the 3D projected object of image1_3D with the aim to identify matching pixels for all pixels constituting the object. This can again be done by using the aforementioned ellipsoids or spheres or cubes. It is then checked for each pixel of image2_3D whether they are comprised within the contours of these volumes, and these pixels which do so, are then considered as corresponding pixels belonging to a corresponding object in 3D.

Alternatively one large volume VO surrounding all projected pixels of the 3D object of image 1_3D can be created, or a volume enveloping the individual small volumes such as the ellipsoids around each pixel, or a mixture of both. Once such a volume VO is chosen or generated, it is determined whether projected pixels of image2_3D are lying or are comprised within the contours of this arbitrary volume VO. All projected pixels of image2_3D comprised within the contours of this volume VO are then identified as belonging to a corresponding object in 3D, and their position in image 2 will be back calculated, upon which the matched object in image 2 is obtained as the back calculation of this 3D group of pixels to the 2D domain.

In some embodiments the volume body can just be the body formed by the 3D projection of the object itself.

Figure 3B:
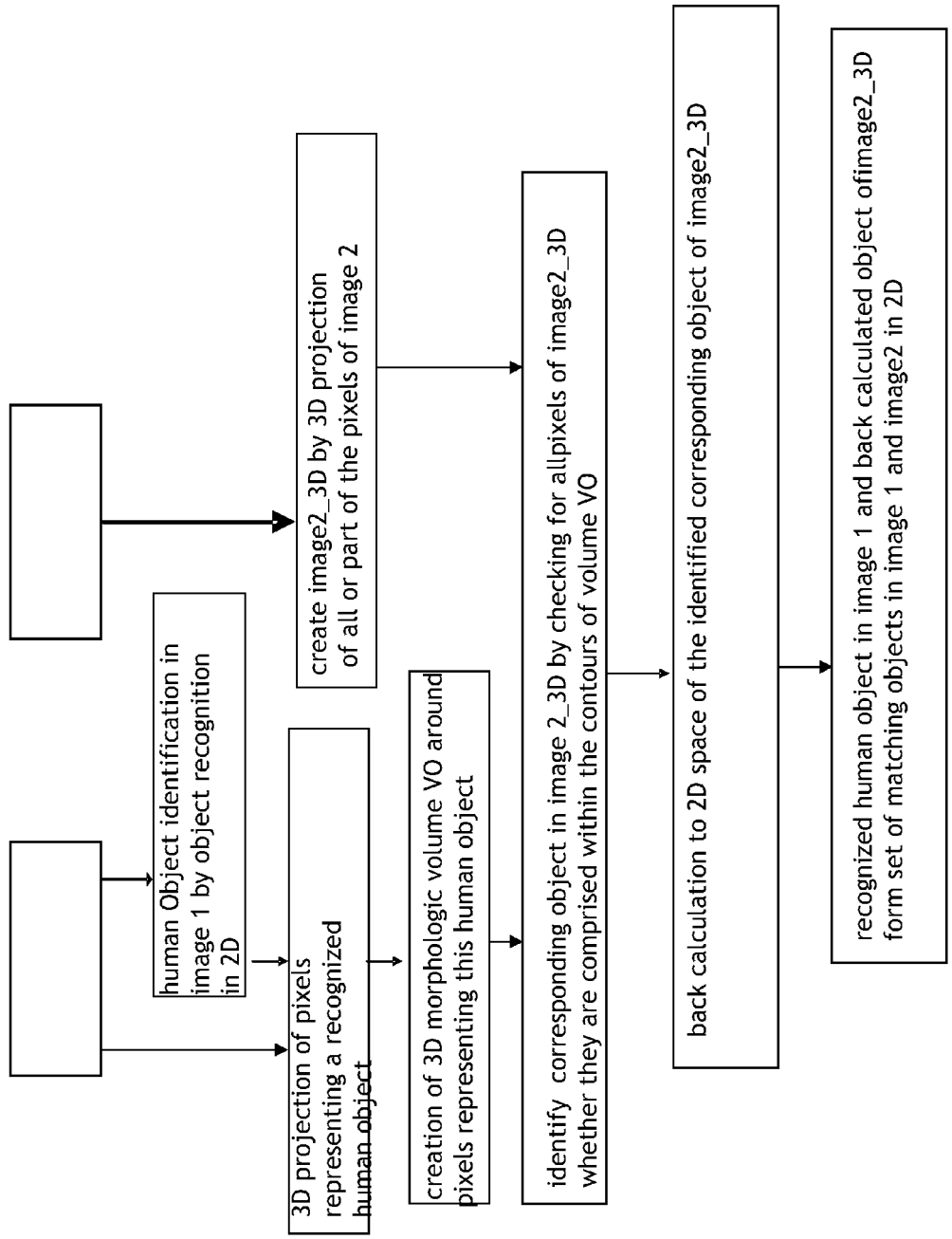
FIG. 3*b* shows a preferred embodiment of the method of FIG. 3*a* which is particularly suited for identifying human objects.

In other embodiments the 3D object is approximated by a volume body. This is e.g. suitable in case the form of the object is known from the recognition process, in which case a generic volume approximating the 3D projected object can be used. For example, if it is known that the recognized object concerns a laptop, some beam shape volume can be chosen to represent this laptop in 3D space. Similarly, if it is known that the object concerns a ball, a sphere can be used to represent this ball. This volume object can therefore also be selected from a library of known volumes resembling the shape of the recognized object in 3D. These basic volumes or shapes can be selected, and optionally further fitted to the object, e.g. by adapting the radius and center point of the selected sphere to approximate the projected ball. While some embodiments apply a rather coarse approximation and fitting via the adaptation of some dimensions of the volumes, in more sophisticated embodiments, the morphology or form of these volumes can even be further fitted to resemble the 3D projected object as close as possible. This may for instance be the case for a recognized human head. In this case some morphological volume having the shape of a human head can either be selected, and further fine tuned, or, in other embodiments even created in the 3D space for thereby fitting the enveloping volume created by the 3D projected pixels of this head. This is shown in FIG. 3b. By checking whether pixels from image2_3D form part of this morphological volume, thus by checking whether they are comprised within the contours of this volume, and by calculating them back to the 2D space, a very easy way to perform human face recognition can be done, even on images which only shown the back of this head. This will be further illustrated when discussing FIG. 5.

A creation of a morphological fitting volume can be performed for all types of objects, so not only for human heads.

In other embodiments several reference images are selected in stead of only one. Image recognition is then performed on all these reference images, with the purpose of increasing the accuracy of the recognition. This is for instance again the case for 3 views or images of a human head taken from left, right and back sides. Image recognition, implying the identification of the person, can not be performed on the view taken from the back side, therefore only the left and right sides can be used. As again these views are on their own not sufficient for a good recognition, both left and right views are then selected as reference views on which the image recognition is performed. Both of them will then be projected to the 3D space and the projections of the recognized objects will then be merged into one 3D recognized object or element for which a corresponding element in the other 3D projected images is to be determined. To search this corresponding 3D object, again it can be checked whether pixels of the 3D projection of the other 3D projected images fall or are comprised within the contours of the volume body approximating the 3D recognized object. Once these pixels are found, they will be calculated back to the corresponding 2D image, leading to the recognition of this human head on the image taken from the back side.

In yet other embodiments the object recognition is not performed in the 2 Dimensional space, but directly in the 3D space. Again one or more selected reference images can then be projected to the 3D space, upon which step the image recognition is performed in 3D. Techniques for doing this are known to a person skilled in the art and can comprise finding 3D feature points- or shapes and asserting whether they combine into a feasible model of the object that is being recognized.

Figure 3C:
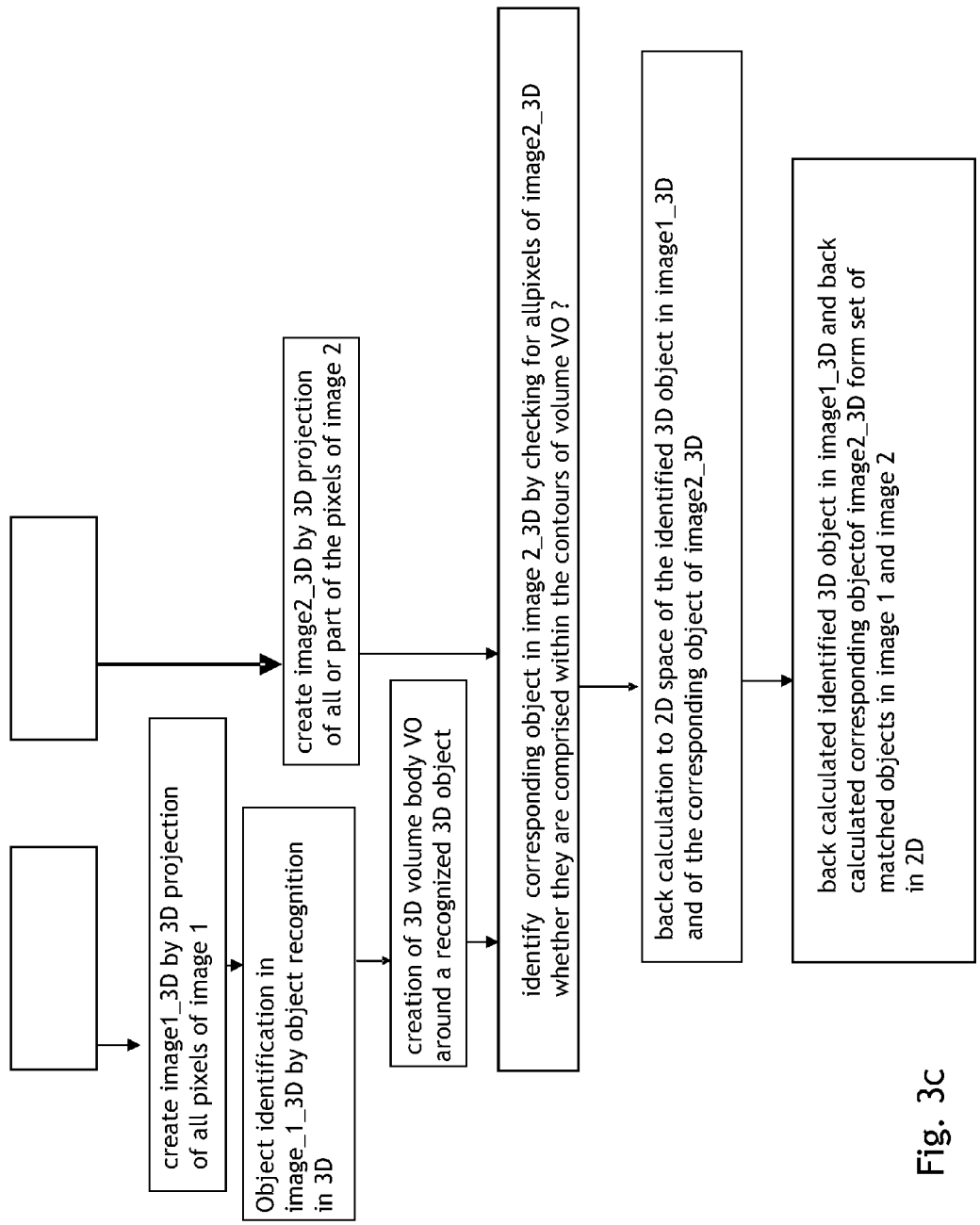
FIG. 3*c* shows another variant embodiment of the method for determining a set of matched objects.

Also in this case more than one reference projection can be used, for the same reasons as for the 2D case. Once the reference objects in the 3D projected reference images are identified, a corresponding object in the 3D projections of the other images is searched for e.g. by approximating this single or set of identified objects in 3D with a body volume, which can thus also just be the 3D projection of this object itself, upon which step the pixels of the projections of the other images, falling within the contours of this body volume, are determined. For the group of pixels complying to this criterion in 3D, a back calculation to the 2D original images including the reference images, will be performed, such as to identify the matched objects in the original 2 D images. FIG. 3c shows an embodiment of this variant where image recognition is performed in the 3D space on the 3D projection of image 1.

Figure 4A:
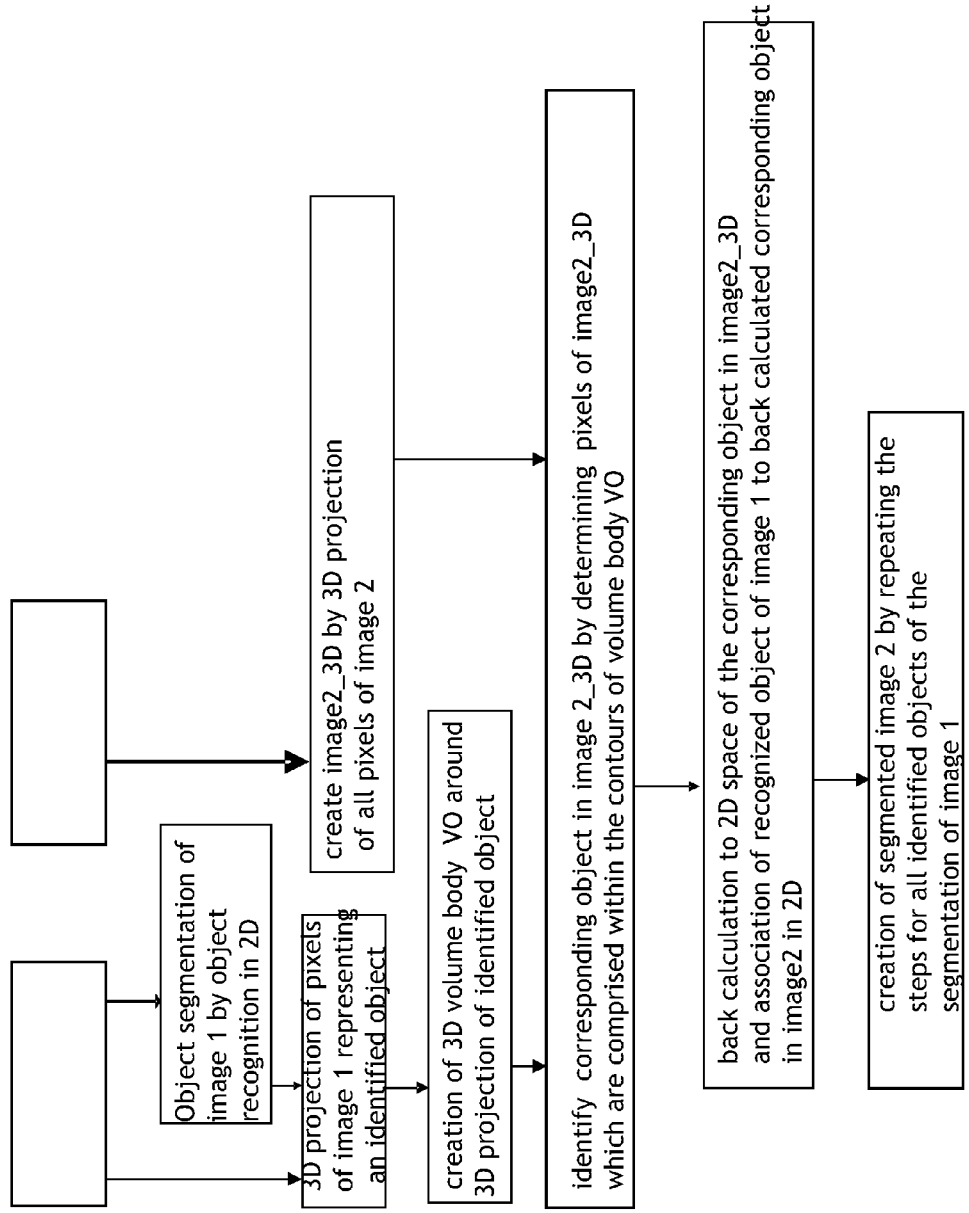
FIG. 4*a* shows an application of the method of FIG. 3*a* used for segmentation of image 2.

FIG. 4a shows a first application of an embodiment of the method used for generating segmented images. It basically shows the same steps as these shown in FIG. 3a, but in this case the whole image 1 is segmented in several objects. For each of the recognized objects in image 1, a matched object, if any, in image2 is determined, which is then also associated to the recognized object. In this way a complete segmentation of image 2 will be obtained, merely based on the segmented image1 and object matching using the aforementioned embodiments of the method. FIG. 4b shows this application for the case where the segmented image 1 contains recognized human objects such as faces. Matching human objects are then identified in image2, again resulting in the segmentation of image2. Of course combinations of both methods are also possible, as in general pictures will contain a mixture of human and non-human objects.

By using this approach, segmentation of a whole plurality of images can thus be obtained from one single segmented image, in general the one which was selected as the best image available for performing pattern recognition. By searching for corresponding elements within the 3D space for the objects recognized in this selected image, determining the corresponding objects in the other images in the original 2D space via the aforementioned 3D techniques, and associating the same recognized objects to the matched objects in the other images, a very simple, yet very powerful matching and segmentation technique is obtained.

Figure 5:
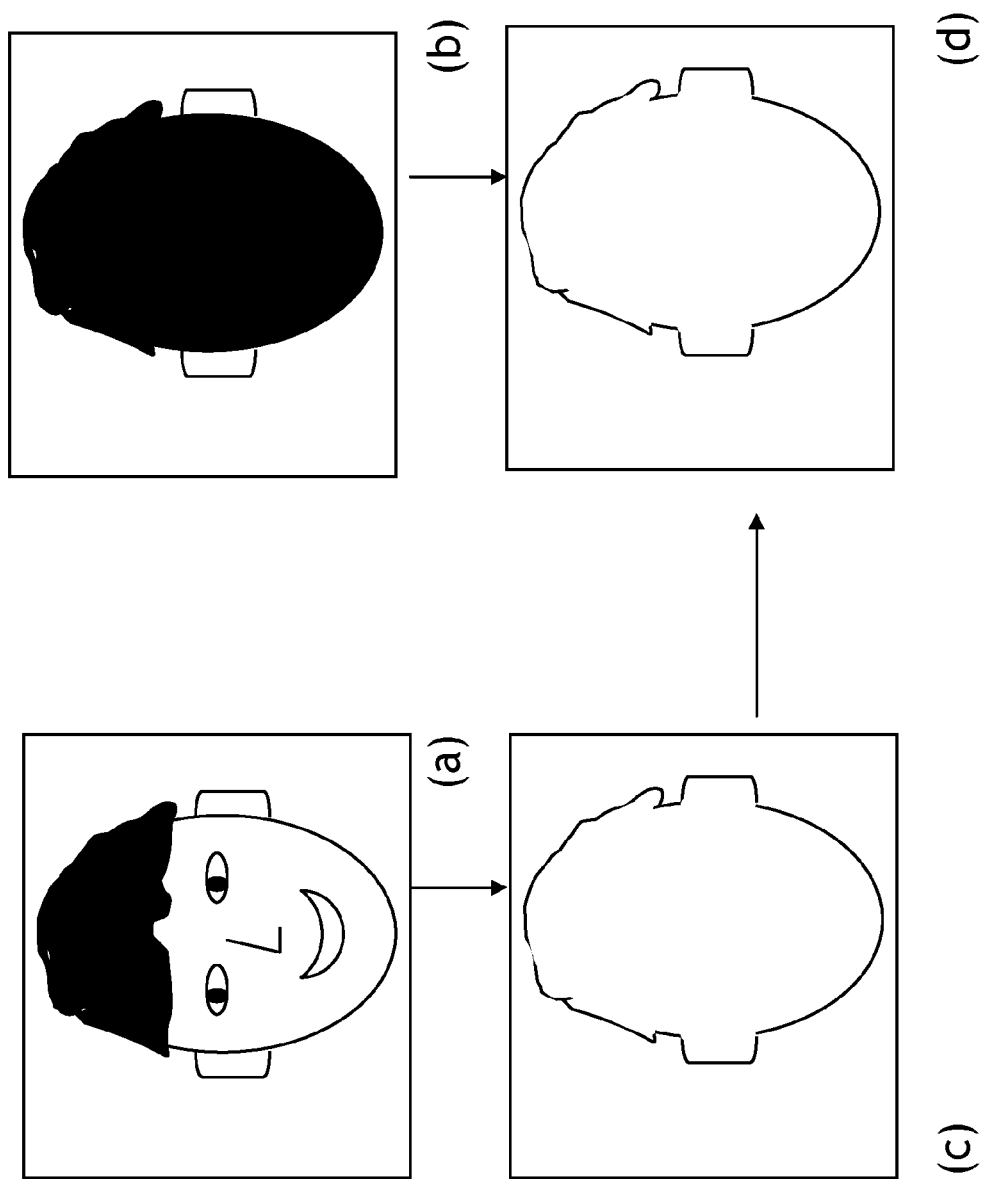

FIG. 5 further illustrates this by means of a very simple example of two images from the same person, but taken from a 180 degrees different angle. Both original 2D pictures are shown as resp. step (a) and (b). Face recognition is possible on image 1, which results in a segmented image 1 in step (c). Due to the lack of enough differentiating features on image 2, this same person can not be recognized on this second image 2 via state of the art methods. By however using embodiments of the method, e.g. the one depicted in FIG. 3b, a morphological volume resembling the head of the recognized person can be generated in the 3D projection of the recognized "John Doe", and pixels of image2_3D falling within this 3D volume will then also be identified as belonging to a matching "John Doe" object in 3D. By back calculating the corresponding 3D pixels of the corresponding "John Doe" in image2_3D, to image 2, recognition of "John Doe" in image 2 and accompanying segmentation can be obtained. This is represented in step (d).

The method as explained for determining matching pixels between several images can be further used in an application for determining motion vectors from one video sequence to one or several other video sequences.

Motion vectors are mostly used with respect to video coding applications, in which context they represent a two-dimensional vector used for inter prediction that provides an offset from the coordinates in an original or decoded picture to the coordinates in a reference picture. Determination of such a two-dimensional motion vector can be done by using block-based correlation methods that traverse parts of this image at a particular instance in time to find matching pixels or blocks of pixels for the pixels or blocks of pixels for the reference image. A motion vector is thereby calculated as the pixel distance between the position of a current block of pixels in this image and the position of the best matching block of the same size and dimensions and orientation in the reference image.

Motion vectors can however be used for purposes which go beyond the mere video coding applications. One of these applications comprises tracking wherein motion vectors can be used to follow an object of interest throughout a video sequence. After identifying this object of interest one can use the motion vectors in the video sequence to track this object of interest throughout time.

In this patent application we will use the term "motion vector" in its most general way, which definition therefore implies a two-dimensions vector which determines a shift between the pixel position of a particular pixel or block in one frame or image, taken at a particular instance in time of a video sequence, and the best matching pixel or block in another frame or image of this video sequence, taken at another particular instance in time.

The traditional determination of such a motion vector between two images therefore implies the identification of a pair of best matching pixels or pixel blocks, one pixel or pixel block from each image.

Figure 6A:
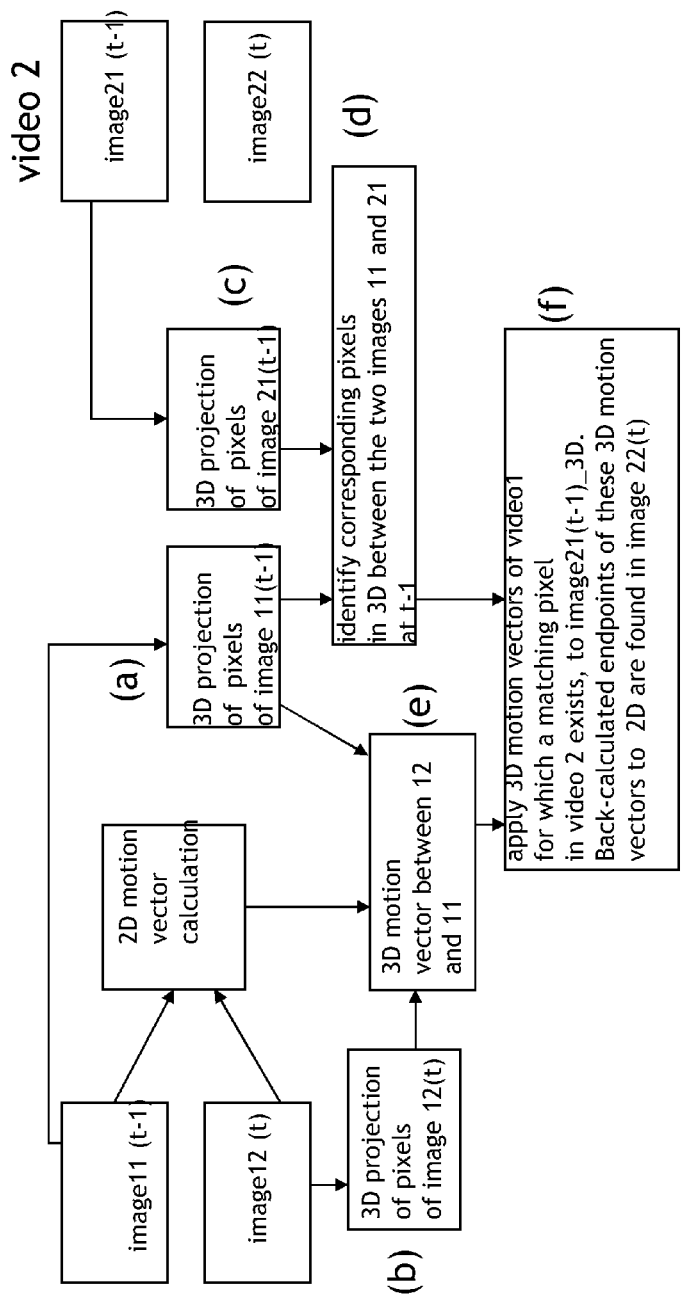
FIG. 6a shows another application of the method of FIG. 2 for determining motion vectors.

A first embodiment for determining such motion vectors in a new alternative way is explained in FIG. 6a. This figure shows two video sequences, video1 and video2, of which only two particular frames at two particular time instances t and t−1, are shown. Of course both video sequences generally comprise much more than 2 frames but instead a series of images or frames, taken at a sequence of time instances. In order not to overload the drawing only two of them are shown: image11($t-1$) and image12($t$) being frames from video 1 at respective time instances t−1 and t, and image21 ($t-1$) and image22($t$) being frames from video 2 at the same respective time instances t−1 and t.

One of the video sequences is selected for performing a traditional 2D determination of the motion vectors on the images. In FIG. 6a video 1 is selected for the traditional 2D motion vector calculation, which is thus based on image11 ($t-1$) and image12($t$). As explained in a previous paragraph, this implies the calculation of matched pixel pairs between image11 and image12. For both pixels of the motion vector pixel pair of both images, the projected pixels in the 3D space are then calculated, as shown in steps (a) and (b), thereby yielding a 3D motion vector for this pixel pair, as shown in step (e).

In parallel matched pixels as explained with respect to the previous embodiments between image pairs image11 and image 21, both taken at t−1, are also determined by means of the 3D projection of these image 11($t-1$) and image 21($t-1$). The 3D projection of image21($t-1$) is shown in step (c). Determination of corresponding pixels in 3D is performed in step (d). This determination can be done using aforementioned techniques making use of e.g. ellipsoids or other volumes placed around pixels of one of the projected images. These calculations yield a set of corresponding pixels between the two projected images image11_3D and image2_3D1 at t−1.

On the other hand start and end pixel values for one or more 3D motion vectors of video 1, were also determined. By combining now both sets, thereby applying the 3D motion vector transformation determined for video1, to corresponding pixels of image 21_3D for the starting pixels of image 11_3D of the 3D motion vectors, end points of corresponding motion vectors for the 3D projection of image 22($t$) are obtained. These can be calculated back to the original image 22($t$). All this is reflected in step (f).

Figure 7A:
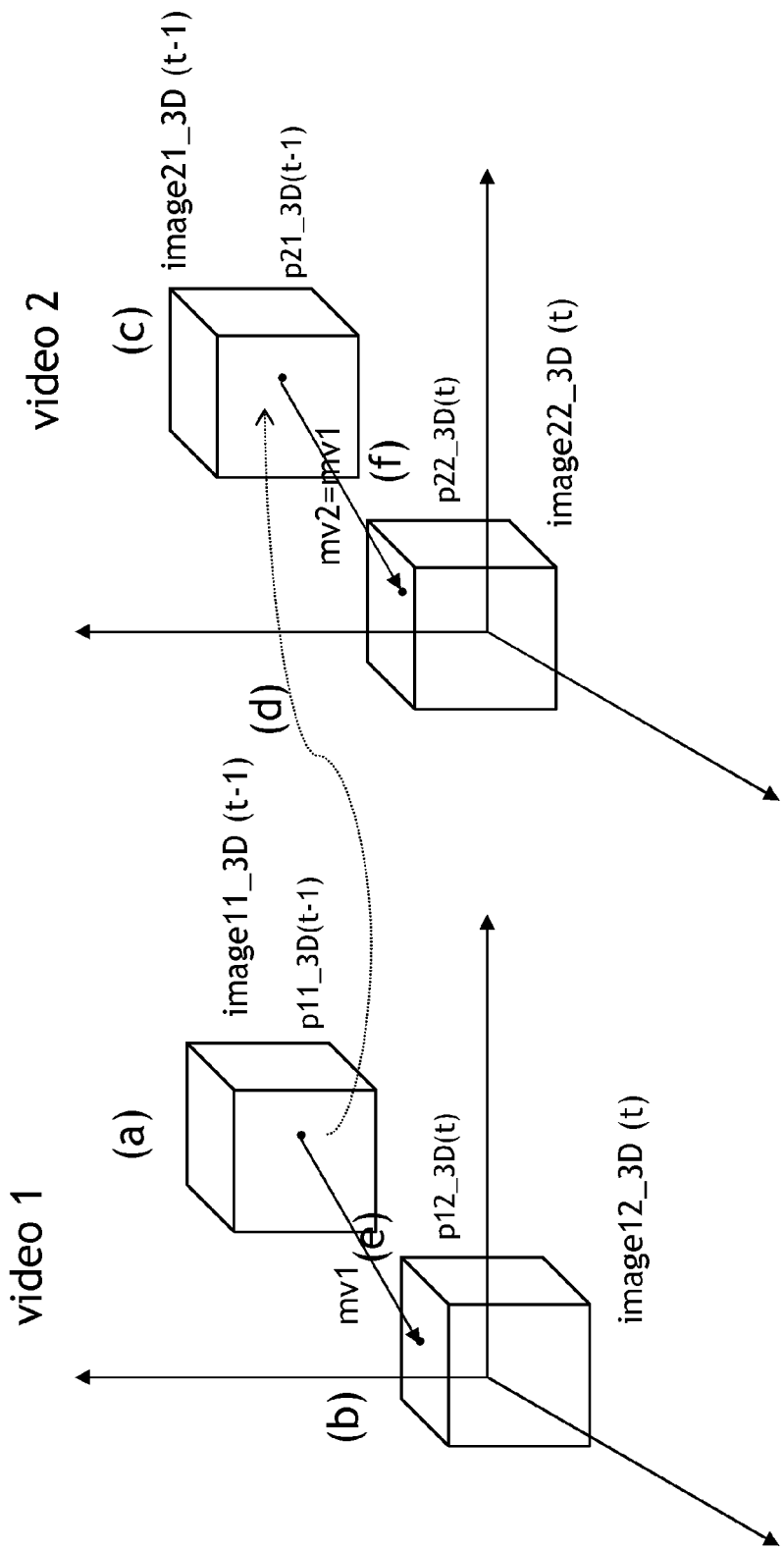

FIG. 7a schematically illustrates this. This figure shows on the left hand side the projections of the images image11 and image12 of video 1, which projections are respectively denoted image11_3D(t−1) and image12_3D(t), in steps (a) and (b). The 3D motion vector mv1 is depicted as well and is obtained as the 3D vector which is joining the 3D projection of a pair of pixels pertaining to an earlier determined 2D motion vector. These 2D motion vector pixels are denoted p11($t-1$) from image11 and p12($t$) from image12, and their 3D projections are respectively denoted p11_3D (t−1) and p12_3D(t). mv1 thereby denotes the 3D motion vector linking both projected pixels in step (e). The right-hand side of this figure shows the 3D projection of image21 ($t-1$), which projection is denoted image21_3D(t−1) in step (c). This 3D projection shows another 3D projected pixel, being p21_3D(t−1), which is obtained as the corresponding pixel in the 3D domain to pixel p12_3D(t−1) by using some of the methods as explained with respect to the search for matching pixels. The result of this determination is shown by step (d).

This FIG. 7a also shows a 3D projection of image22($t$). This 3D projection is just shown for explanatory reasons, as this 3D projection is not needed for the calculation of the 3D motion vector mv2 in this embodiment. Indeed, in this embodiment it is assumed that mv2 equals mv1. This is denoted by step (f). Therefore the same 3D motion vector mv2=mv1 is applied to p21_3D(t−1) as starting point, which yields p22_3D(t) as a 3D end point.

Once then the end points of the 3D motion vector in the 3D projections of images image21($t-1$)_3D and image 22($t$)_ 3D are determined, these are back calculated to the original images image21($t-1$) and image22($t$) respectively. This results in 2D motion vectors being calculated for video2 without having to do a full motion vector estimation step on this video sequence. This method thus provides an inexpensive way of finding motion vectors that can be used for video encoding and optimization of many image processing techniques such as image recognition, image segmentation, stereo matching, tracking and so on. It is to be remarked that during the back calculation from the 3D end points of the motion vectors to the original 2D image22($t$), a depth parameter will result. While this depth parameter is not the actual measured or stereoscopically obtained depth from image22($t$), it is an estimate based on the depths of image11($t-1$), image12($t$) and image21($t-1$), which were used for calculating 3D projections of these images. Anyhow, this depth parameter is already a good estimate which can be used, e.g. as a starting point during further fine tuning of this depth parameter value using the more traditional methods based on e.g. stereoscopic image analysis.

Figure 6B:
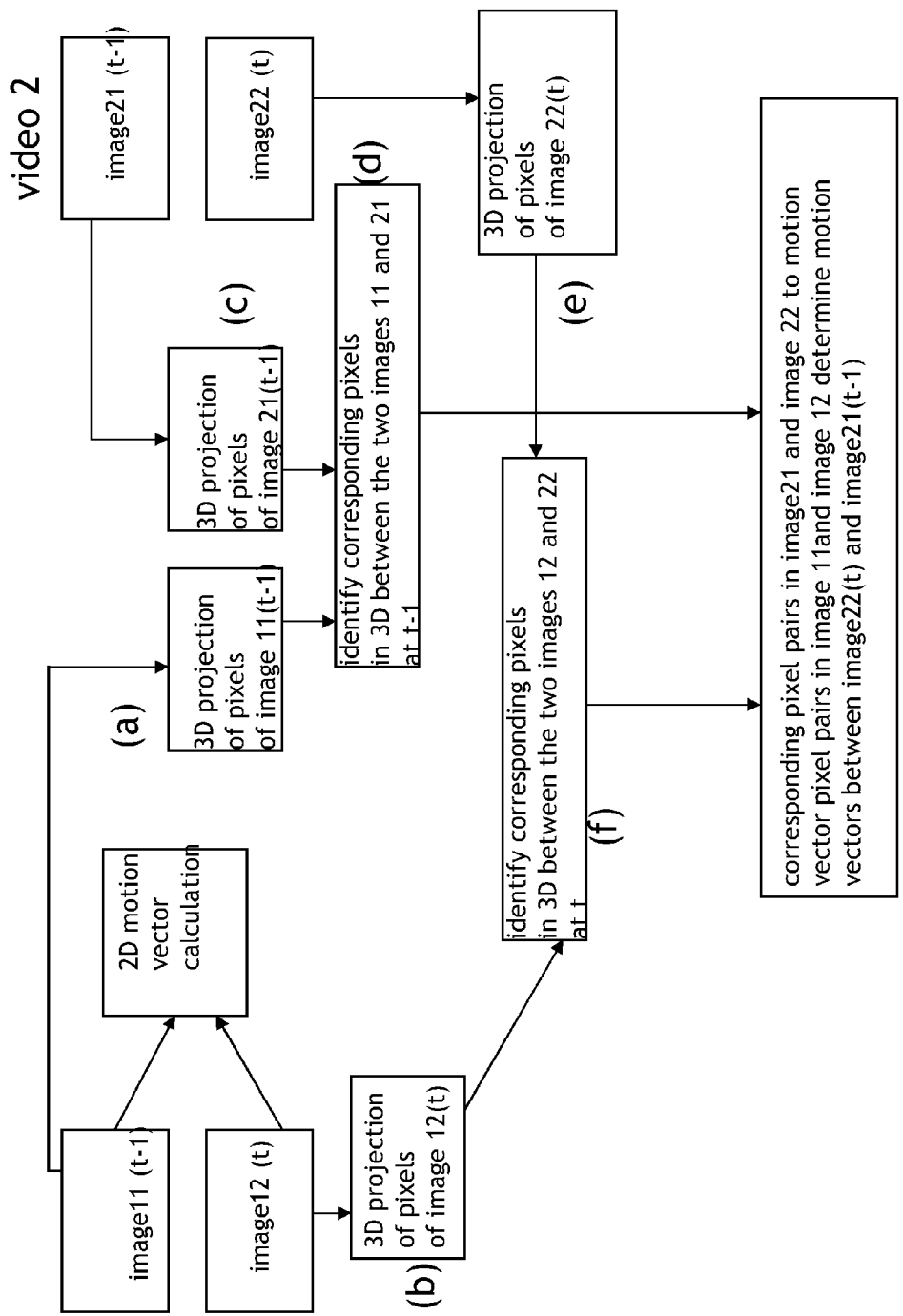
FIG. 6b shows an alternative for the embodiment shown in FIG. 6a for determining motion vectors, FIG. 7a schematically explains the method for determining motion vectors as set out in FIG. 6a and FIG. 7b schematically explains the method for determining motion vectors as set out in FIG. 6b.
Figure 7B:
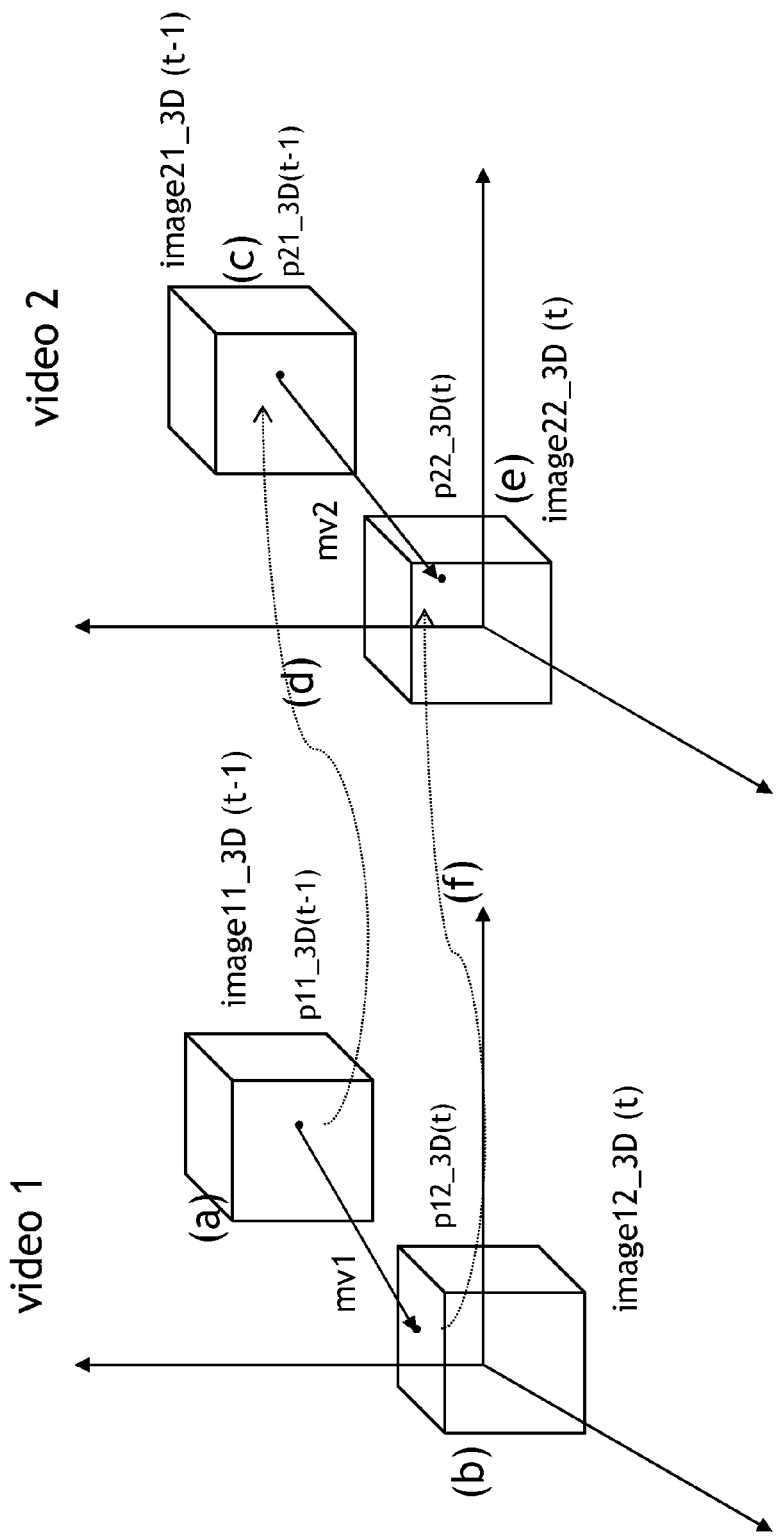

FIGS. 6b and 7b show another variant method for determining such a 2D motion vector. Steps (a), (b), (c) and (d) are similar to these shown in FIGS. 6a and 7a, and their explanation will therefore not be repeated. In contrast however to the variant of FIGS. 6a and 7a, this embodiment makes use of a depth parameter for image22($t$), which thus allows to generate a 3D projection of this image, denoted image22_3D(t). This is done in step (e).

This then allows to determine a corresponding pixel in image22_3D(t) for the end point p12_3D(t) of the 3D motion vector in image12_3D(t). This corresponding pixel is denoted p22_3D(t), and its determination is shown in step (f). In this way start and end points for a 3D motion vector mv2 of video 2 are obtained, and these can then be calculated back to the original images in 2D, which thereby yield a corresponding 2D motion vector in video2.

It can be remarked that the motion vector which is obtained by using the second variant method can be more accurate compared to the one obtained by means of the first described variant method. But this higher accuracy is obtained at the expense of more processing effort as the 3D projection of image22(*t*) is to be created, which itself depends on the availability of depth values. In case these are not available, or in case processing efficiency represents a more restrictive boundary condition, the first described variant may be preferred.

While the principles of the invention have been described above in connection with specific apparatus, it is to be clearly understood that this description is made only by way of example and not as a limitation on the scope of the invention, as defined in the appended claims.

The invention claimed is:

1. An image processing method for determining at least one set of matched attributes (pixel1i, pixel2j; object1i, object2j) between a plurality of images (image 1, image2), said method comprising the steps of:
   using a processor and a memory to create a spatial 3-dimensional search space by projecting at least part of the images of said plurality of images to said spatial 3-dimensional space resulting in a plurality of spatial 3-dimensional projected images(image1_3D, image2_3D);
   using the processor and the memory to search for at least one set of corresponding spatial 3-dimensional elements within the spatial 3-dimensional projected images of the plurality of spatial 3-dimensional projected images; and
   using the processor and the memory to calculate back said corresponding spatial 3-dimensional elements of said at least one set to corresponding 2-dimensional attributes within the plurality of images and providing said corresponding 2-dimensional attributes (pixel1i, pixel2j; object1i, object2j) within said images as said at least one set of matched attributes.

2. A method according to claim 1 further comprising the steps of:
   selecting one image (image 1) of said plurality as a reference image;
   identifying a preliminary attribute on said reference image; and
   identifying the spatial 3-dimensional projection of said preliminary attribute as a spatial 3-dimensional element (pixel3D, object3D) of said at least one set of corresponding spatial 3-dimensional elements whereby at least one corresponding spatial 3-dimensional element is searched in the spatial 3-dimensional projected images of the other images of the plurality of images.

3. A method according to claim 2 wherein said preliminary attribute comprises a pixel and wherein said at least one corresponding spatial 3-dimensional element is searched by forming a volume body around the spatial 3-dimensional projection of said pixel such that projected pixels of the spatial 3-dimensional projected images of the other images of the plurality which are falling within the contours of said volume body are identified as corresponding spatial 3-dimensional elements for said spatial 3-dimensional projection of said pixel.

4. A method according to claim 3 wherein said volume body is an ellipsoid centered around said spatial 3-dimensional projection of said pixel.

5. A method according to claim 1 wherein an element of said at least one set of corresponding spatial 3-dimensional elements comprises at least one projected spatial 3-dimensional object obtained from one or more spatial 3-dimensional projections of respective reference images selected from said plurality; and
   wherein a corresponding spatial 3-dimensional element is determined as a group of spatial 3-dimensional projections of pixels from another projected image of said plurality of images which spatial 3-dimensional projections of pixels are falling within the contours of a volume body approximating said at least one projected spatial 3-dimensional object, such that said at least one set of matched attributes is obtained by the back calculation of said at least one projected spatial 3-dimensional object and of said group to the original images in the 2-dimensional domain.

6. A method according to claim 5 further comprising a step of 2-dimensional image recognition on said respective reference images such that to said at least one projected spatial 3-dimensional object at least one recognized object on said respective reference images is associated.

7. A method according to claim 5 further comprising a step of spatial 3-dimensional image recognition on said one or more spatial 3D projections of said respective reference images, such that to said at least one projected spatial 3-dimensional object at least one recognized object resulting from said spatial 3-dimensional image recognition is associated.

8. A method according to claim 5 wherein said volume body is selected from a set of volume models associated to said at least one projected spatial 3-dimensional object.

9. A method according to claim 5 further comprising a step of adapting said volume body by fitting said volume body with said at least one projected spatial 3-dimensional object.

10. A method according to claim 1 such that the matched attributes of said at least one set of matched attributes, and pertaining to said image, will be associated to said at least one recognized object on said respective reference images.

11. A method according to claim 1, for determining a motion vector between two images (image21(*t*−1), image22 (*t*)) of a video sequence (video2) taken at different instances in time (t−1, t), said method further comprising the steps of:
   determining a matched pixel (p21) within a first (image21 (*t*−1)) of said two images at the earliest instance in time (t−1), for a start pixel (p11) of a 2-dimensional motion vector determined between two images (image11(*t*−1), image12(*t*)) taken at said different instances in time (t−1, t) of a first video sequence (video1); and
   projecting said 2-dimensional motion vector of said first video sequence to the spatial 3-dimensional space, for obtaining a spatial 3-dimensional motion vector (mv1), wherein said spatial 3-dimensional motion vector (mv1) is applied to the spatial 3-dimensional projection (p21_3D(t−1)) of said matched pixel (p21) to thereby obtain a corresponding end point (p22_3D(t−1)) which is further back projected to an end pixel (p22) in a second image (image22(*t*)) of said two images such that said matched pixel (p21) and said end pixel (p22) define said motion vector between said two images of said video sequence.

12. A method according to claim 1, for determining a motion vector between two images (image21(*t*−1), image22 (*t*)) of a video sequence (video2) taken at different instances in time (t−1, t), further comprising the step of:
   determining respective matched pixels (p21, p22) within said two images for the start (p11) and end (p12) pixels of a 2-dimensional motion vector determined between two images (image11(*t*−1), image12(*t*)) taken at said different instances in time (t−1, t) of a first video sequence (video1), said pair of respective matched pixels (p21, p22) in said two images (image21(*t*−1), image22(*t*)) thereby defining start and end pixels of said motion vector of said video sequence.

13. An image processing device for determining at least one set of matched attributes between a plurality of images, said device comprising a processor and a memory configured to perform the following steps:
- creating a spatial 3-dimensional search space by projecting at least part of the images of said plurality of images to said spatial 3-dimensional space resulting in a plurality of spatial 3-dimensional projected images;
- searching for at least one set of corresponding spatial 3-dimensional elements within the spatial 3-dimensional projected images of the plurality of spatial 3-dimensional projected images; and
- calculating back said corresponding spatial 3-dimensional elements of said at least one set to corresponding 2-dimensional attributes within the plurality of images and providing said corresponding 2-dimensional attributes within said images as said at least one set of matched attributes.

14. A device according to claim 13 wherein the processor and the memory are further configured to perform the steps of:
- selecting one image (image 1) of said plurality as a reference image;
- identifying a preliminary attribute on said reference image; and
- identifying the spatial 3-dimensional projection of said preliminary attribute as a spatial 3-dimensional element (pixel3D, object3D) of said at least one set of corresponding spatial 3-dimensional elements whereby at least one corresponding spatial 3-dimensional element is searched in the spatial 3-dimensional projected images of the other images of the plurality of images.

15. A device according to claim 14 wherein said preliminary attribute comprises a pixel and wherein said at least one corresponding spatial 3-dimensional element is searched by forming a volume body around the spatial 3-dimensional projection of said pixel such that projected pixels of the spatial 3-dimensional projected images of the other images of the plurality which are falling within the contours of said volume body are identified as corresponding spatial 3-dimensional elements for said spatial 3-dimensional projection of said pixel.

16. A device according to claim 13 wherein an element of said at least one set of corresponding spatial 3-dimensional elements comprises at least one projected spatial 3-dimensional object obtained from one or more spatial 3-dimensional projections of respective reference images selected from said plurality; and
- wherein a corresponding spatial 3-dimensional element is determined as a group of spatial 3-dimensional projections of pixels from another projected image of said plurality of images which spatial 3-dimensional projections of pixels are falling within the contours of a volume body approximating said at least one projected spatial 3-dimensional object, such that said at least one set of matched attributes is obtained by the back calculation of said at least one projected spatial 3-dimensional object and of said group to the original images in the 2-dimensional domain.

17. A device according to claim 16 wherein the processor and the memory are further configured to perform the step of 2-dimensional image recognition on said respective reference images such that to said at least one projected spatial 3-dimensional object at least one recognized object on said respective reference images is associated.

18. A device according to claim 16 further configured to perform a step of spatial 3-dimensional image recognition on said one or more spatial 3D projections of said respective reference images, such that to said at least one projected spatial 3-dimensional object at least one recognized object resulting from said spatial 3-dimensional image recognition is associated.

19. A device according to claim 13, configured to determine a motion vector between two images (image21($t$−1), image22($t$)) of a video sequence (video2) taken at different instances in time (t−1, t), the device being configured to perform the steps of:
- determining a matched pixel (p21) within a first (image21($t$−1)) of said two images at the earliest instance in time (t−1), for a start pixel (p11) of a 2-dimensional motion vector determined between two images (image11($t$−1), image12($t$)) taken at said different instances in time (t−1, t) of a first video sequence (video1); and
- projecting said 2-dimensional motion vector of said first video sequence to the spatial 3-dimensional space, for obtaining a spatial 3-dimensional motion vector (mv1), wherein said spatial 3-dimensional motion vector (mv1) is applied to the spatial 3-dimensional projection (p21_3D(t−1)) of said matched pixel (p21) to thereby obtain a corresponding end point (p22_3D(t−1)) which is further back projected to an end pixel (p22) in a second image (image22($t$)) of said two images such that said matched pixel (p21) and said end pixel (p22) define said motion vector between said two images of said video sequence.

20. The device according to claim 13, wherein the processor and the memory are configured to determine a motion vector between two images (image21($t$−1), image22($t$)) of a video sequence (video2) taken at different instances in time (t−1, t), the device being configured to perform the step of:
- determining respective matched pixels (p21, p22) within said two images for the start (p11) and end (p12) pixels of a 2-dimensional motion vector determined between two images (image11($t$−1), image12($t$)) taken at said different instances in time (t−1, t) of a first video sequence (video1), said pair of respective matched pixels (p21, p22) in said two images (image21($t$−1), image22($t$)) thereby defining start and end pixels of said motion vector of said video sequence.

21. An image processing computer program product comprising a computer readable non-transitory tangible storage medium having computer program logic recorded thereon for enabling a processor to determine at least one set of matched attributes between a plurality of images, said computer program logic performing the steps of:
- creating a spatial 3-dimensional search space by projecting at least part of the images of said plurality of images to said spatial 3-dimensional space resulting in a plurality of spatial 3-dimensional projected images;
- searching for at least one set of corresponding spatial 3-dimensional elements within the spatial 3-dimensional projected images of the plurality of spatial 3-dimensional projected images; and
- calculating back said corresponding spatial 3-dimensional elements of said at least one set to corresponding 2-dimensional attributes within the plurality of images and providing said corresponding 2-dimensional attributes within said images as said at least one set of matched attributes.

* * * * *